US010112799B2

(12) United States Patent
Friedli

(10) Patent No.: US 10,112,799 B2
(45) Date of Patent: Oct. 30, 2018

(54) ELEVATOR INSTALLATION MODERNIZATION USING AN EXISTING INTERFACE

(71) Applicant: Inventio AG, Hergiswil NW (CH)

(72) Inventor: Paul Friedli, Remetschwil (CH)

(73) Assignee: Inventio AG, Hergiswil NW (CH)

( * ) Notice: Subject to any disclaimer, the term of this patent is extended or adjusted under 35 U.S.C. 154(b) by 607 days.

(21) Appl. No.: 14/625,864

(22) Filed: Feb. 19, 2015

(65) Prior Publication Data

US 2015/0158695 A1 Jun. 11, 2015

Related U.S. Application Data

(63) Continuation of application No. 13/119,115, filed as application No. PCT/EP2009/061916 on Sep. 15, 2009, now Pat. No. 8,967,335.

(30) Foreign Application Priority Data

Sep. 16, 2008 (WO) ................. PCT/EP2008/062303

(51) Int. Cl.

| | |
|---|---|
| ***B66B 1/28*** | (2006.01) |
| ***G05B 15/00*** | (2006.01) |
| ***B66B 1/24*** | (2006.01) |
| ***B66B 19/00*** | (2006.01) |
| ***B66B 1/34*** | (2006.01) |

(52) U.S. Cl.

CPC .......... *B66B 1/2458* (2013.01); *B66B 1/3446* (2013.01); *B66B 19/007* (2013.01); *B66B 2201/102* (2013.01); *B66B 2201/103* (2013.01); *B66B 2201/211* (2013.01); *B66B 2201/214* (2013.01); *Y10T 29/49716* (2015.01)

(58) Field of Classification Search

CPC ... B66B 1/2458; B66B 1/3446; B66B 19/007; B66B 2201/102; B66B 2201/103; B66B 2201/211; B66B 2201/214; Y10T 29/49716

USPC .......................................................... 187/247

See application file for complete search history.

(56) References Cited

U.S. PATENT DOCUMENTS

| | | | |
|---|---|---|---|
| 4,697,243 | A | 9/1987 | Moore et al. |
| 4,844,204 | A | 7/1989 | Ovaska et al. |
| 5,027,299 | A | 6/1991 | Uetani |

(Continued)

FOREIGN PATENT DOCUMENTS

| | | | |
|---|---|---|---|
| CN | 1426953 | A | 7/2003 |
| EP | 1319625 | A1 | 6/2003 |

(Continued)

*Primary Examiner* — Jeffrey Donels
(74) *Attorney, Agent, or Firm* — Baker & Hostetler LLP

(57) ABSTRACT

An elevator installation for serving at least one floor in at least one building can be modernized, the elevator installation comprising at least one elevator with at least one elevator car and at least one elevator control. At least one destination call terminal for input of at least one destination call and/or for recognition of at least one identification code is installed on at least one input floor. At least one destination call control is installed. The destination call terminal is, for communication of the destination call signal, connected with the destination call control. The destination call control can be connected to the elevator control through a serial interface of the elevator control.

18 Claims, 9 Drawing Sheets

(56) References Cited

U.S. PATENT DOCUMENTS

| | | | |
|---|---|---|---|
| 5,352,857 A | 10/1994 | Ovaska | |
| 5,357,064 A | 10/1994 | Boyce et al. | |
| 5,389,748 A | 2/1995 | Burke et al. | |
| 6,330,935 B1 | 12/2001 | Systermans | |
| 6,892,861 B2 * | 5/2005 | Friedli | B66B 1/18 187/247 |
| 6,935,465 B2 * | 8/2005 | Friedli | B66B 1/18 187/247 |
| 7,073,633 B2 | 7/2006 | Weinberger et al. | |
| 7,699,142 B1 | 4/2010 | Wurth et al. | |
| 7,828,120 B2 | 11/2010 | Kocher et al. | |
| 7,900,750 B2 | 3/2011 | Mattsson et al. | |
| 7,918,318 B2 | 4/2011 | Friedli | |
| 8,172,043 B2 | 5/2012 | Hughes et al. | |
| 8,517,149 B2 | 8/2013 | Flynn et al. | |
| 8,640,831 B2 | 2/2014 | Talonen | |
| 8,646,579 B2 | 2/2014 | Schuster | |
| 8,662,255 B2 | 3/2014 | Flynn et al. | |
| 8,820,486 B2 * | 9/2014 | Gerstenkorn | B66B 1/468 187/247 |
| 8,967,335 B2 * | 3/2015 | Friedli | B66B 1/2458 187/247 |
| 2003/0034209 A1 | 2/2003 | Tang et al. | |
| 2003/0116384 A1 | 6/2003 | Friedli | |
| 2006/0259777 A1 | 11/2006 | Izawa | |
| 2008/0062981 A1 | 3/2008 | Gerstenkorn | |
| 2011/0120814 A1 | 5/2011 | Schuster | |

FOREIGN PATENT DOCUMENTS

| | | |
|---|---|---|
| EP | 1900672 A1 | 3/2008 |
| EP | 1 935 824 | 6/2008 |
| EP | 2288562 B1 | 1/2013 |
| GB | 2274001 A | 7/1994 |
| JP | 09-278313 | 10/1997 |
| JP | 2003-201076 A | 7/2003 |
| JP | 2009-278313 A | 11/2009 |
| WO | 02/46081 A2 | 6/2002 |
| WO | 2004/106211 A1 | 12/2004 |
| WO | 2009/132697 A1 | 11/2009 |

* cited by examiner

PRIOR ART

PRIOR ART

PRIOR ART

PRIOR ART

ELEVATOR INSTALLATION MODERNIZATION USING AN EXISTING INTERFACE

CROSS-REFERENCE TO RELATED APPLICATIONS

This application is a continuation of U.S application Ser. No. 13/119,115, filed on Aug. 26, 2011, which is the national stage application of International Application No. PCT/EP2009/061916, filed on Sep. 15, 2009, which claims priority to European Patent Office Application No. PCT/EP2008/062303, filed on Sep. 16, 2008. All of these applications are incorporated herein by reference.

FIELD

The disclosure relates to technologies for modernizing an elevator installation.

BACKGROUND

Elevator installations for transporting persons/goods are relatively long-term capital cost items with service lives of 20 years and more. If after a lengthy period of time, a general overhaul of an elevator installation is contemplated, then the components of the elevator installation are often technologically old, which requires the exchange to a greater or lesser extent of the elevator components. This is generally referred to as modernization.

Using known methods of modernization of an elevator installation, the transport capacity of the elevator installation during the modernization is, in the best scenario, maintained. However, the transport capacity is often reduced during modernization. If in an elevator installation with, for example, three elevators an elevator is exchanged then this means a temporary reduction in the transport capacity by 33%. However, during the modernization the users do not want to suffer any losses in convenience and are still to be transported as quickly and directly as possible. Long waiting times and/or inconvenient transfers are perceived to be undesirable.

EP1935824A1, which is incorporated herein by reference, discloses a method of modernizing an elevator installation in which existing floor terminals for call input of floor calls and existing car terminals for call input of car calls are replaced by destination call terminals for input of destination calls. The destination call terminals communicate the destination calls to a call detection unit for evaluation of the destination calls. The call detection unit is connected with an existing group control and now communicates, in place of the floor calls and the car calls, destination calls to the group control. The group control selects, for serving the destination call, an elevator car of the elevator installation and initially moves the elevator car to the input floor of the destination call and from there to the destination floor of the destination call.

SUMMARY

In an embodiment, the technologies relate to a method of modernizing an elevator installation for serving at least one floor in at least one building, where the elevator installation includes at least one elevator with at least one elevator car and at least one elevator control. As part of the modernization, at least one destination call terminal is installed tor allowing the input of at least one destination call and/or for recognition of at least one identification code. At least one destination call signal is generated by the destination call terminal for an input destination call and/or for a recognized identification code. At least one destination call control is installed. The destination call terminal is connected with the destination call control for communication of the destination call signal. Based on the destination call signal, the destination call control generates at least one start floor signal for a journey of the elevator car to the input floor of the destination call terminal and at least one destination floor signal for a journey of the elevator car from the input floor to the destination floor associated with the destination call signal and/or the identification code. The start floor signal and the destination floor signal are communicated by the destination call control to the elevator control via an interface to the elevator control.

According to an embodiment of this method, a destination call control can be connected via an existing interface of the elevator control and thus a destination call signal indicating a start floor signal and a destination floor signal can be communicated in a simple and quick manner to the existing elevator control. This existing interface of the elevator control may be in the form of a serial interface, such as for example, a serial maintenance interface.

According to an embodiment of the present method, a known interface of the elevator installation can be used. Thus, no communications lines of the elevator installation have to be identified and connected with inputs and outputs of a call detection unit according to EP1935824A1. This can save time and work and is sometimes also less susceptible to error.

According to an embodiment of the present method, a communications protocol of the maintenance interface is used; however, the protocol is used for a different purpose, namely for modernization of the elevator installation.

One signal line is used to connect the destination call control and the elevator control. The start floor signal is communicated by the destination call control via the signal line to the elevator control. The destination floor signal is also communicated by the destination call control via he signal line to the elevator control.

In this manner, the destination call control and the existing elevator control are connected in a simple and quick manner via a signal line. This has an unexpected effect, namely that a simple, quick, permanent and conclusive modernization of the elevator installation is achieved in a 'Plug & Play' manner using an existing elevator control with a new destination call control.

As part of the modernization, at least one destination call terminal communications line is installed for connection of the destination call terminal and the destination call control. The input destination call is communicated as at least one destination call signal via at least the destination call terminal communications line to the destination call control. In the case of an identification code input by a user, the identification code is communicated as at least one destination call signal by the destination call terminal via the destination call terminal communications line to the destination call control and at least one stored destination call is associated by the destination call control with the identification code which was input.

In this way, the destination call terminal and the destination call control are connectible in a simple and quick manner via a signal line, and that an input destination call and/or an input identification code can be communicated via the signal line.

According to one embodiment, the elevator installation to be modernized includes at least one existing floor terminal for input of a floor call at an input floor. The existing floor terminal is connected with the elevator control. The existing elevator installation also includes at least one existing car terminal for input of a car call which indicates a destination floor. The existing car call terminal is also connected with the elevator control. An elevator car is controlled by the elevator control in accordance with a communicated floor call to travel to an input floor and the elevator car is further controlled by the elevator control in accordance with a communicated car call to then travel to the destination floor. As part of the modernization, at least one destination call terminal is installed on the input floors served by the elevator installation. The existing floor terminals and car call terminal is/are made inaccessible. The result is that the existing floor terminals or the existing car terminal is/are no longer present for users, so that also no double input of calls and no confusion of users can occur.

According to one embodiment, the elevator installation to be modernized includes at least one existing destination terminal for input of a destination call at an input floor. The existing destination call terminal is connected with the elevator control. An elevator car is controlled by the elevator control in accordance with a communicated destination call to travel to an input floor and the elevator car is further controlled by the elevator control in accordance with a communicated destination call to then travel to the destination floor. As part of the modernization, at least one destination call terminal is installed on the floors served by the elevator installation. The existing destination terminal is made inaccessible. The result is that the existing destination terminal is no longer present for users, so that also no double input of calls and no confusion of users can occur.

According to one embodiment, instead of installing at least one destination call terminal for input of at least one destination call and/or for input of at least one identification code, at least one existing destination call terminal on at least one input floor is used for generating at least one destination call signal and/or an identification code. At least one destination call control is installed which receives from the existing destination call terminal said destination call signal and/or said identification code. Said destination call control generates at least one start floor signal for a journey of the elevator car to an input floor of the existing destination call terminal and at least one destination floor signal for a journey of the elevator car from said input floor to a destination floor associated with the destination call signal and/or the identification code. The destination call control is connected with at least one elevator control of the elevator installation by way of at least one interface such that the start floor signal and the destination floor signal are communicated by the destination call control via the interface to the elevator control. The result is that an existing destination call terminal is reused with a newly installed destination call control. This method and system is cost-efficient because of the reuse of the existing destination call terminal and it is highly efficient because of the newly installed destination call control which comprises faster hardware and improved software in comparison to a 10 or 20 year old group control.

If the elevator installation is operated with at least one group control, the group control is separated from the elevator control. In other words, the elevator control is logged off and/or functionally disconnected from the group control. This may be achieved, for example, by communicating a logging-off signal from the destination call control to the elevator control and the logging-off signal causes the elevator control to log off at the group control.

As a result, the existing group control of the elevator installation is made redundant, since the destination call control directly communicates with the individual elevator controls.

A modernized elevator installation is operated in accordance with the present method for modernization. At least one journey by at least one most favorable elevator car from the input floor to the destination floor with shortest possible waiting time and/or shortest possible destination time is determined by the destination call control for at least one destination call signal communicated by the destination call terminal.

The optimal and/or most favorable car allocation for a journey up to the destination floor is carried out by the destination call control, which is more efficient than the selection of an elevator car for serving a floor call using the existing group control.

The elevator interface is used by the destination call control in accordance with at least one protocol of the elevator control. The start floor signal is communicated by the destination call control to the elevator control in accordance with the protocol of the elevator control. The destination floor signal is also communicated to the elevator control by the destination call control in accordance with the protocol of the elevator control.

As a result, the commands to the elevator control are in accordance with the known protocol of the interface, and are usable for the purpose of modernization of the elevator installation.

A start floor signal is communicated by the destination call control to the elevator control via the interface in accordance with a protocol of the elevator control as if it were a floor call of an existing floor terminal at the input floor or a destination call of an existing destination call terminal at the input floor. The start floor signal is communicated by the destination call control to the elevator control via the interface in accordance with at least one protocol of the elevator control as a floor call and/or destination call at the input floor for example indicating either travel destination in an upward direction or a downward direction. Similarly, a destination floor signal is communicated by the destination call control to the elevator control in accordance with at least one protocol of the elevator control as if it were a car call in an elevator car or a destination call at the input floor specifying the destination floor, with the travel destination either in an upward direction or a downward direction. The destination floor signal is communicated by the destination call control to the elevator control via the interface in accordance with at least one protocol of the elevator control as a car call or destination call to the destination floor.

The different commands of the interface protocol are selectively usable for the purpose of the modernization of the elevator installation. Thus, a command “car call” can be used not only as a start floor signal, but also as a destination floor signal.

The current availability of an elevator may be communicated by the elevator control via the interface to the destination call control. Also, the current loading of the elevator may be communicated by the elevator control to the destination call control via the interface. Further, the current position of the elevator car in the elevator shaft may also he communicated by the elevator control to the destination call control via the interface.

In this way, the destination call control obtains from the elevator controls multiple items of information using the protocol of the interface.

The current availability which is communicated by the elevator control may be used by the destination call control for determination of a journey from the input floor to the destination floor by the most favorable elevator car, with one or both of the shortest possible waiting time and/or the shortest possible destination time. The current loading information which may be communicated by the elevator control is used by the destination call control for determination of a journey from the input floor to the destination floor by the most favorable elevator car, with one or both of the shortest possible waiting time and/or the shortest possible destination time. The current elevator car position in the elevator shaft which is communicated by the elevator control may be used by the destination call control for determination of a journey from the input floor to the destination floor by the most favorable elevator car, with either one or both of the shortest possible waiting time and/or the shortest possible destination time.

The destination call control obtains from the elevator one or more items of information, such as the availability of an elevator, the current loading of an elevator and the current position of the elevator car using the protocol of the elevator control interface and can use these items of information for determination of a most favorable car allocation.

The current position of the elevator car in the elevator shaft may be communicated by the elevator control to the destination call control via the interface. The most favorable journey by an elevator car from the input floor to the destination floor with shortest possible waiting time and/or the shortest possible destination time is determined by the destination call control for at least one destination call signal communicated by the destination call terminal. A start floor signal at the input floor is communicated by the destination call control via the interface to the elevator control of the most favorable elevator car. The destination call control monitors whether the current position of the most favorable elevator car in the elevator shaft corresponds with the input floor. As soon as the current position of the most favorable car in the elevator shaft corresponds with the input floor, a destination floor signal is communicated by the destination call control to the elevator control of the most favorable car via the interface control.

The destination call control monitors the current position of the most favorable elevator car in the elevator shaft and the destination floor signal is communicated to the elevator control of the most favorable elevator car only when the most favorable elevator car has arrived at the input floor.

A destination call acknowledgement signal is communicated by the destination call control to that destination call terminal which has communicated the destination call signal to the destination call control. The destination call acknowledgement signal is communicated by the destination call control via the destination call terminal communications line to that destination call terminal which has communicated the destination call signal to the destination call control. The destination call acknowledgement signal may be optically and/or acoustically output on an input/output device of the destination call terminal. The destination call acknowledgement signal may also indicate the most favorable elevator car. Further, the destination call acknowledgement signal may also indicate the determined arrival time at the start floor, as well as the determined arrival time at the destination floor.

In this way, the user receives from the destination call control and/or from the destination call terminal a destination call acknowledgement signal as feedback to a destination call.

In accordance with an embodiment of the present invention, a system and method for performing the modernizing of an elevator installation are provided. A destination call terminal for input of either a destination call or for input of an identification code is installed on an input floor. The destination call terminal generates a destination call signal based on a destination call which is input by a user at the destination call terminal. Alternatively, the destination call terminal may be used to receive an identification code provided by the user. At least one destination call control is installed. The destination call terminal is, connected with the destination call control in order to communicate the destination call signal and/or the received identification code. The destination call control generates, for a communicated destination call signal, a start floor signal for a journey of the elevator car first to the input floor of the destination call terminal, and a destination floor signal for the journey of the elevator car from the input floor to the destination floor associated with the destination call and/or identification code. The destination call control is connected with at least one elevator control via at least one interface. The destination call control communicates the start floor signal and the destination floor signal to the elevator control via the interface.

A system having a destination call terminal and destination call control is connected with an existing elevator control by way of an existing elevator interface and a destination call signal having a start floor signal and destination floor signal is thus communicated in a simple and quick manner to the existing elevator control.

A programmed processor executing a computer program stored in computer readable memory may be used as part of the present invention for performing and realizing the method of operating a modernized elevator installation.

The programmed processor and the computer program can be provided and maintained simply and quickly in order to perform the method of operating a modernized elevator installation.

BRIEF DESCRIPTION OF THE DRAWINGS

The disclosed technologies are described in detail by way of exemplifying embodiments in the following, in which.

DETAILED DESCRIPTION

Figure 1:
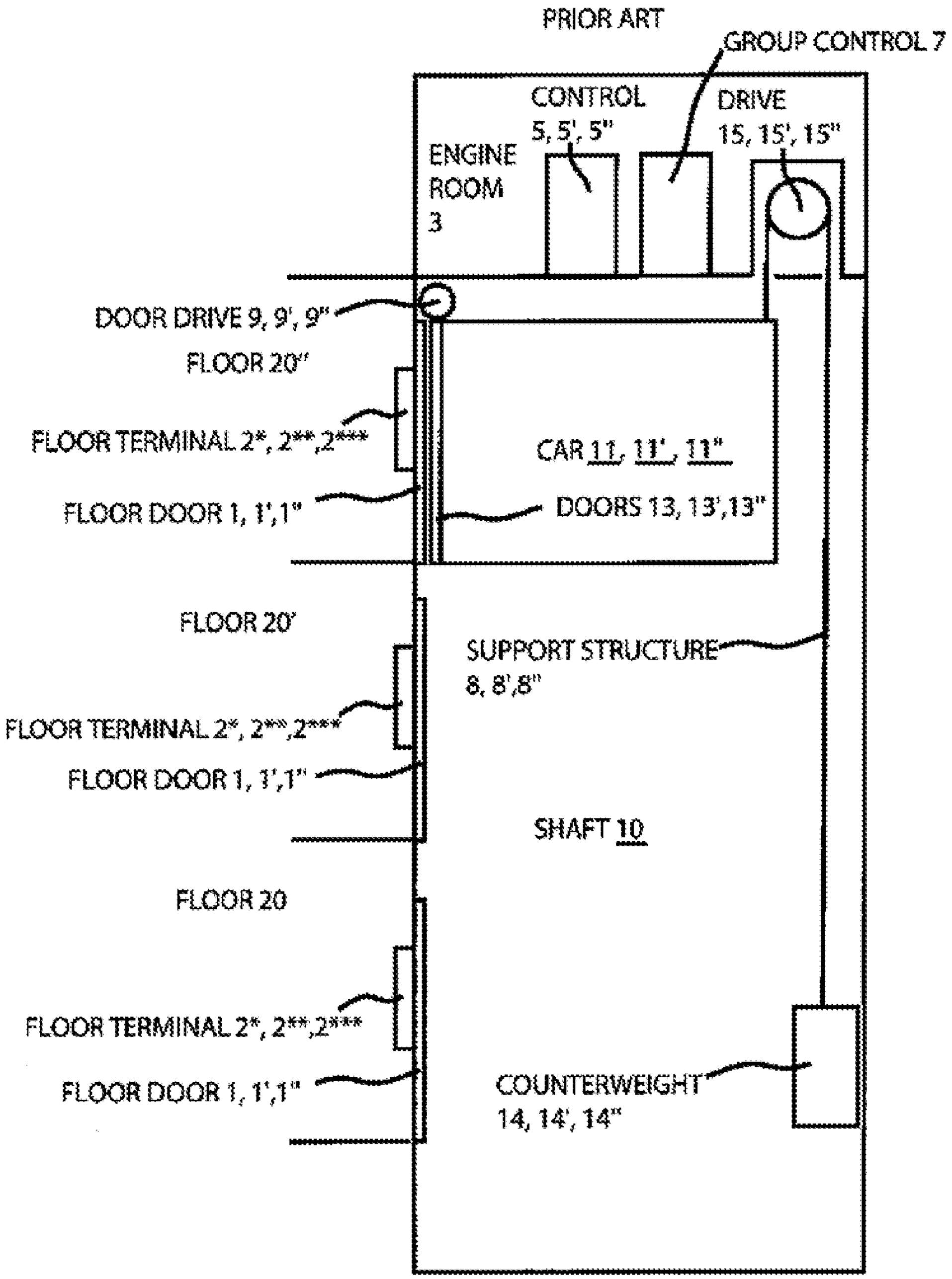
FIG. 1 shows a schematic view of a part of a first exemplifying embodiment of a conventional elevator installation with group control which is to be modernized.
Figure 2:
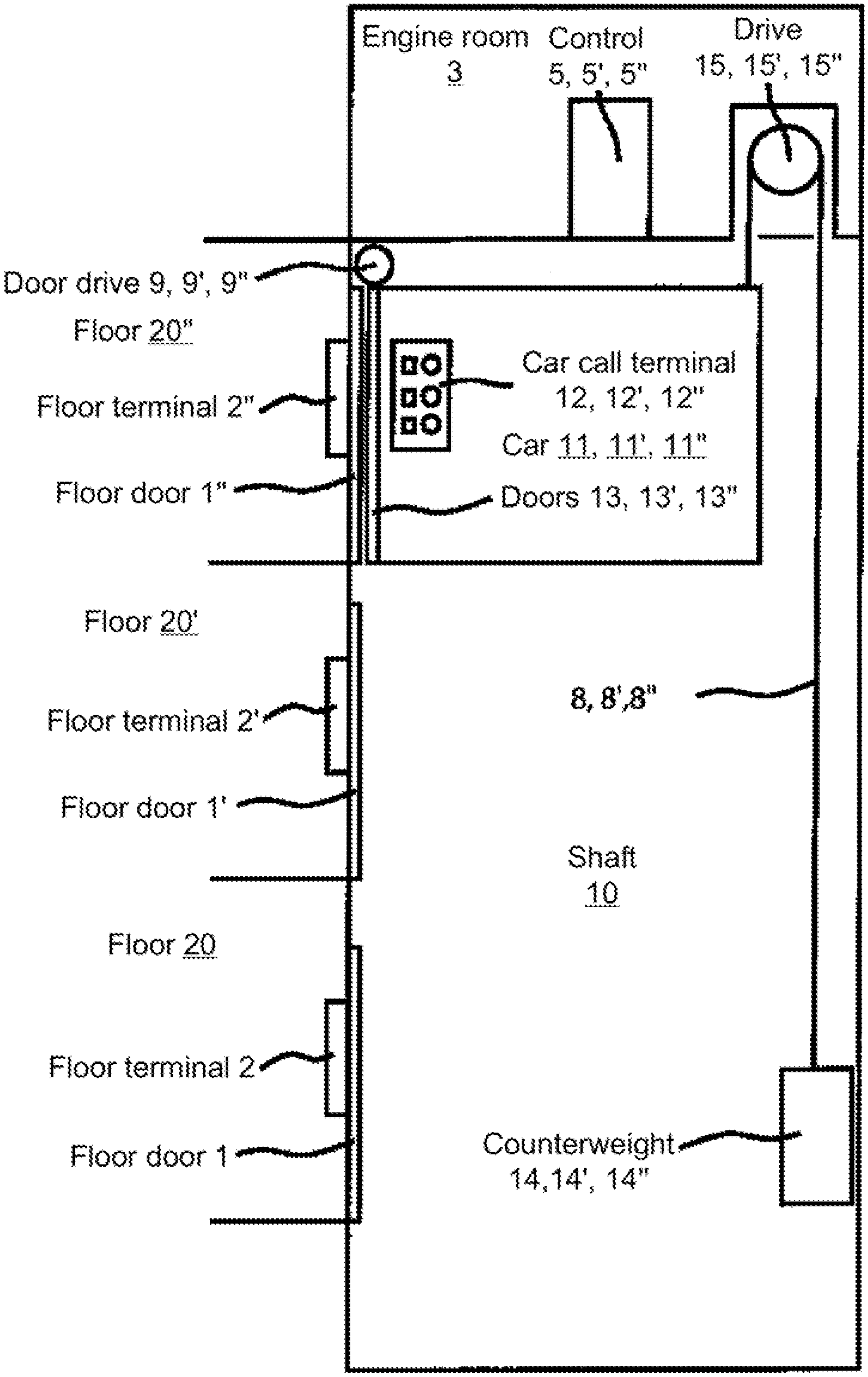
FIG. 2 shows a schematic view of a part of a second exemplifying embodiment of a conventional elevator installation without group control which is to be modernized.
Figure 5:
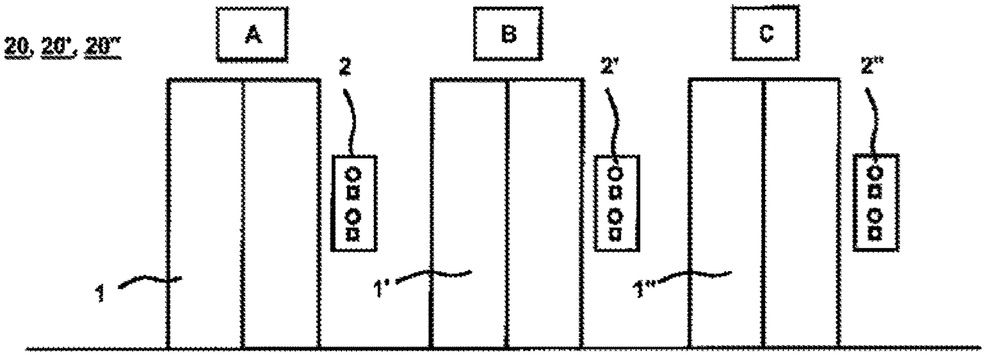
FIG. 5 shows a view of a part of a floor of the second exemplifying embodiment of a conventional elevator installation, which is to be modernized, according to FIG. 2.

FIGS. 1 and 2 show a schematic view of a part of exemplifying embodiments of an elevator installation which is to be modernized. Further details are illustrated in FIG. 5 which shows a part of a floor 20, 20', 20" of the elevator installation, which is to be modernized, according to FIGS. 1 and 2. The elevator installation is installed in a building with, for example, three floors 20, 20', 20". Several elevator cars 11, 11', 11" move in at least one elevator shaft 10. For example, the elevator installation includes three elevators A, B, C each with a respective elevator car 11, 11', 11". Each elevator car 11, 11', 11" is connected with a respective counterweight 14, 14', 14" by way of at least one respective support structure 8, 8', 8". Each support structure 8, 8', 8" is driven by a respective elevator drive 15, 15', 15". Access to the elevator cars 11, 11', 11" takes place from the floors 20, 20', 20" via respective floor doors 1, 1', 1" and car doors 13, 13', 13". The floor doors 1, 1', 1" and car doors 13, 13', 13" of the elevator cars 11, 11', 11" are opened and closed in co-ordinated manner by at least one respective door drive 9, 9', 9". For example, a door drive 9, 9', 9" is arranged on each respective elevator car 11, 11', 11". Each elevator A, B, C is controlled by a respective elevator control 5, 5', 5". The elevator control 5, 5', 5" controls the rotational direction, the speed and the braking of the door drive 9, 9', 9" and of the elevator drive 15, 15', 15". In the exemplifying embodiments of FIGS. 7 to 12 the elevator control 5, 5', 5" is for that purpose directly connected with a door drive 9, 9', 9" by way of at least one door drive communications line 109, 109', 109" and the elevator control 5, 5', 5" is directly connected with an elevator drive 15, 15', 15" by way of at least one elevator drive communications line 115, 115', 115". The door drive communications line 109, 109', 109" and the elevator drive communications line 115, 115', 115" are, for example, signal lines on which at least one electrical voltage signal and/or at least one electrical current signal is conducted. The door drive communications line 109, 109', 109" leads from at least one output 5.2, 5.2', 5.2" of the elevator control 5, 5', 5" to the door drive 9, 9', 9". The elevator drive communications line 115, 115', 115" leads from at least one output 5.2, 5.2', 5.2" of the elevator control 5, 5', 5" to the door drive 15, 15', 15". For example, the elevator drives 15, 15', 15" together with the elevator controls 5, 5', 5" are arranged in an engine room 3 above the elevator shaft 10.

In accordance with FIGS. 2 and 5, for input of a floor call at least one existing floor terminal 2, 2', 2" is located at at least one floor 20, 20', 20". As shown in FIG. 5, there may be one existing floor terminal 2, 2', 2" located on each floor 20, 20', 20" near each elevator A, B, C. The existing floor terminal 2, 2', 2" has at least one call button for input of a floor call. The existing floor terminal 2, 2', 2" often has two call buttons for combined input of a floor call and the travel direction (upwards or downwards) desired by the user. In accordance with FIG. 1, for input of a destination call at least one existing destination call terminal 2*, 2 , 2** is located at at least one floor 20, 20', 20". The existing destination call terminal 2*, 2**, 2*** has at least one call button for input of a destination call. The exemplifying embodiments of an elevator installation, which is to be modernized, in accordance with FIG. 1, 7 and 9 includes a group control 7. The exemplifying embodiment of an elevator installation, which is to be modernized, in accordance with FIGS. 2 and 11 has no group control 7. In the exemplifying embodiments of FIGS. 7 and 9 an existing destination terminal 2*, 2**, 2*** is directly connected with at least one group control 7 for communicating a destination call by way of at least one floor terminal communications line 102, 102', 102". In the exemplifying embodiment of FIG. 11 an existing floor terminal 2, 2', 2" is directly connected with at least one elevator control 5, 5', 5" for communicating an input floor call by way of at least one floor terminal communications line 102, 102', 102". The floor call is communicated as at least one call input floor signal to the group control 7 or to the elevator control 5, 5', 5"; alternatively the destination call is communicated as at least one destination call signal to the group control 7 or to the elevator control 5, 5', 5". The floor terminal communications line 102, 102', 102" is, for example, a signal line on which at least one electrical voltage signal or at least one electrical current signal is conducted. The floor terminal communications line 102, 102', 102" begins at at least one output 2.1, 2.1', 2,1" of the existing floor terminal 2, 2', 2" or existing destination call terminal 2*, 2**, 2*** and ends at at least one input 7.1, 71', 7.1" of the group control 7 or alternatively at at least one input 5.1, 5.1', 5.1" of the elevator control 5, 5', 5". The floor call and/or the destination call indicates to the group control 7 and/or the elevator control 5, 5', 5" the input floor from which a user would like to be moved in the building by an elevator A, B, C. A destination call indicates additionally the destination floor to which a user would like to be moved in the building by an elevator A, B, C. A call input floor call signal which is transmitted to the group control 7 and/or to the elevator control 5, 5', 5" is confirmed by the group control 7 and/or by the elevator control 5, 5', 5" by a call input floor acknowledgement signal. The call input floor acknowledgement signal is transmitted from the input 7.1 7.1', 7.1" of the group control 7 via the floor terminal communications line 102, 102', 102" to the output 2.1, 2.1', 2.1" of the existing floor terminal 2, 2', 2" and output on at least one output device in the form of a display (e.g., lamp) and/or audibly (e.g., on a loudspeaker) at the existing floor terminal 2, 2', 2". Alternatively, a destination call signal which is transmitted to the group control 7 and/or to the elevator control 5, 5', 5" is confirmed by the group control 7 and/or by the elevator control 5, 5', 5" by a destination call acknowledgement signal. The destination call acknowledgement signal is transmitted from the input 7.1, 7.1', 7.1" of the group control 7 via the floor terminal communications line 102, 102', 102" to the output 2.1, 2.1', 2.1" of the existing destination call terminal 2*, 2**, 2*** and output on at least one output device in the form of a display (e.g., lamp) and/or audibly (e.g., on a loudspeaker) at the existing destination call terminal 2*, 2**, 2***, The communication between the floor 2, 2', 2" and the group control 7 or the elevator control 5, 5', 5"** may thus be bidirectional.

For serving the floor call, the group control 7 selects an elevator car 11, 11', 11". The selected elevator car 11, 11', 11" may be that elevator car 11, 11', 11" which serves the floor call and/or destination call as quickly as possible, i.e., with the shortest possible waiting time for the user. The waiting time is typically the time period between the call input and the opening of floor door 1, 1', 1" and car door 13, 13', 13" of an elevator car 11, 11', 11" on the input floor. The group control 7 is also located in, for example, the engine room 3. The group control 7 is directly connected with the elevator control 5, 5', 5" via at least one elevator control communications line 105, 105', 105". In the exemplifying embodiment according to FIG. 7 the elevator control communications line 105, 105', 105" is at least one signal bus, in which each of the various components connected to the bus may be identified, e.g., each of the communications participants is uniquely identifiable by way of a signal bus address. The communication in the signal bus is bidirectional and may be realized by, for example, a bus system such as Local Operating Network (LON), Ethernet, etc. In the exemplifying embodiment according to FIG. 9 the elevator control communications line 105, 105', 105" is a signal line on which at least one electrical voltage signal and/or at least one electrical current signal is conducted. The elevator control communications line 105, 105', 105" leads from at least one output 7.2, 7.2', 7.2" of the group control 7 to at least one input 5.1, 5.1', 5.1" of the elevator control 5, 5', 5". The group control 7 selects an elevator car 11, 11', 11" in that it communicates at least one call input floor signal to the elevator control 5, 5', 5" of an elevator car 11, 11', 11". In accordance with the communicated call input floor signal, the elevator drive 15, 15', 15" is so controlled by the elevator control 5, 5', 5" of the selected elevator car 11, 11', 11" so that the selected elevator car 11, 11', 11" is moved to the call input floor. According to the communicated call input floor signal, the door drive 9, 9', 9" is so controlled by the elevator control 5, 5', 5" of the selected elevator car 11, 11', 11" so that the floor door 1, 1', 1" and the car door 13, 13', 13" are opened and the user can enter the selected elevator car 11, 11', 11".

The user then enters a car call in the elevator car 11, 11', 11" of the elevator A, B, C. In accordance with the exemplifying embodiment of FIG. 2 an existing car call terminal 12, 12', 12" for input of a car call is located in each elevator car 11, 11', 11". The existing car call terminal 12, 12', 12" may be connected by way of at least one car call terminal communications line 112, 112', 112" with the group control 7 and/or with the elevator control 5, 5', 5". In the exemplifying embodiment according to FIG. 11 the existing car call terminal communications line 112, 112', 112" is directly connected with the elevator control 5, 5', 5". The car call terminal communications line 112, 112', 112" is, for example, a signal line on which at least one electrical voltage signal and/or at least one electrical current signal is conducted. The car call terminal communications line 112, 112', 112" begins at at least one output 12.1, 12.1', 12.1" of the existing car call terminal 12, 12', 12" and ends at the input 7.1, 7.1', 7.1" of the group control 7 and/or at the input 5.1, 5.1', 5.1" of the elevator control 5, 5', 5". The car call is communicated as at least one destination floor signal to the group control 7 and/or to the elevator control 5, 5', 5". A destination floor signal which is input at the group control 7 and/or at the elevator control 5, 5', 5" is confirmed by the group control 7 and/or the elevator control 5, 5', 5" by a destination floor acknowledgement signal. The destination floor acknowledgement signal is transmitted from the input 7.1, 7.1', 7.1" of the group control 7 via the car call terminal communications line 112, 112', 112" to the output 12.1, 12.1', 12.1" of the existing car call terminal 12, 12', 12" and issued at at least one output device in the form of a visual display (e.g., a lamp) and/or audibly (e.g., on a loudspeaker) at the existing car call terminal 12, 12', 12". The communication between the car call terminal 12, 12', 12" and the group control 7 and/or the elevator control 5, 5', 5" may thus he bidirectional. The elevator drive 15, 15', 15" is so controlled by the elevator control 5, 5', 5" such that the elevator car 11, 11', 11" is moved to the destination floor. After the elevator car 11, 11', 11" has arrived at the destination floor the door drive 9, 9', 9" is so controlled by the elevator control 5, 5', 5" such that the floor door 1, 1', 1" and the car door 13, 13', 13" are opened and the user can leave the elevator car 11, 11', 11".

The elevator control 5, 5', 5" includes at least one interface 5.3, 5.3', 5.3". The interface 5.3, 5.3', 5.3" is, for example, a serial interface such as Recommended Standard 232 (RS232), Recommended Standard 422 (RS422), Universal Serial Bus (USB), etc. At least one input 25.1 of at least one maintenance device 25 is temporarily connectible with the interface 5.3, 5.3', 5.3" by way of at least one communication link, for example a communication line or a wireless communication connection 125. The interface 5.3, 5.3', 5.3" is thus a maintenance interface. The communication between the elevator control 5, 5', 5" and the maintenance device 25 takes place by way of the communications line 125 in accordance with the protocol of the maintenance device, which may be a proprietary or standardized protocol. The protocol can support a synchronous communication or an asynchronous communication. The maintenance device 25 can communicate with several elevator controls 5, 5', 5". The communication can be unidirectional, for example, by at least two signal lines, but it can also be bidirectional, for example, by four signal lines. Neither the RS232 standard nor the RS422 standard provides a mechanical specification of a plug for the particular standard. Accordingly, the number of pins and pin layout of a plug for the interface 5.3, 5.3', 5.3" may he different and may depend on each application. Thus. D-sub plugs with 37, 25, 15 or even 9 pins may be used. However, type-A and type-B plugs in accordance with the USB standard may also be used. The output voltages and difference voltages amount to a few volts of electrical direct voltage. According to the RS422 standard the maximum data transmission rate is 10 Mbps and the maximum line length is 1200 meters.

The maintenance device 25 is, for example, a portable computer such as a laptop, a smartphone, a mobile telephone, etc. The input 25.1 of the signal line 125 for the interface 5.3, 5.3', 5.3", at least one input/output device and at least one electric power supply are arranged in at least one housing of the maintenance device 25. The input/output device may be in the form of a keyboard and/or a display screen and/or a touch screen, etc. The maintenance device 25 includes at least one processor and at least one computer readable data memory. At least one computer program from the computer readable data memory is executed by the processor. The computer program controls the maintenance operation according to the protocol of the interface 5.3, 5.3', 5.3". For example, a maintenance engineer maintains the elevator installation at regular and/or irregular intervals of a few weeks or a few months. For that purpose a maintenance engineer goes to the engine room 3 of the elevator installation and temporarily connects the maintenance device 25 by way of the interface 5.3, 5.3', 5.3'" with the elevator control 5, 5', 5". The maintenance engineer can input at least one command on the input/output device and communicate by way of the input 25.1 of the signal line 125 to the interface 5.3, 5.3', 5.3" at the elevator control 5, 5', 5". At least one item of information communicated by the elevator control 5, 5', 5" via the interface 5.3, 5.3', 5.3" and the signal line 125 to the input 25.1 of the maintenance device 25 is issued on the input/output device to the maintenance engineer.

The protocol of the interface 5.3, 5.3', 5.3" is typically modular and includes at least one operations subsystem, a elevator drive subsystem and a door drive subsystem. A set of commands typically exists for each subsystem. The elevator control 5, 5', 5" is controlled by a sequential series of commands. The elevator control 5, 5', 5" communicates at least one item of information for each communicated command. Depending on the respective protocol construction it is also possible for the elevator control 5, 5', 5" to communicate a plurality of items of information continuously and/or at regular intervals in time and/or at irregular intervals in time without command invitation. The following, non-exclusive list with commands and/or items of information is useful for the maintenance:

"Start" starts a communication,

"Elevator designation" indicates the elevator A, B or C with which a communication by way of the interface 5, 5', 5" exists, "Elevator status" indicates whether or not an elevator A, B, C is available for serving floor calls and/or car calls, "Maintenance operation" brings the elevator A, B, C into a special operating mode in which the floor calls and/or car calls are not served, "Normal operation" brings the elevator A, B, C into a normal operating mode in which floor calls and/or car calls are served, "Log on at group control" activates an elevator control 5, 5', 5" to log on at the group control 7, "Log off at group control" activates an elevator control 5, 5', 5" to log off at the group control 7, "Number of journeys" indicates the number of journeys of the elevator A, B, C per predefined time unit, "Rotational direction" indicates the direction of rotation of the elevator drive 15, 15', 15", "Car position" indicates the current position of the elevator car 11, 11', 11" in the elevator shaft 10, "Floor call" generates a floor call to an input floor, "Floor call upwards" generates a floor call to an input floor with indication of the journey desired from the input floor in an upward direction, "Floor call downwards" generates a floor call to an input floor with indication of the journey desired from the input floor in a downward direction, "Car call mode" indicates the current car call served by the elevator A, B, C, "Car call" generates a car call to a destination floor, "Door status" indicates the status "closed", "open", "closing" or "opening" of a floor door 1, 1', 1' and/or car door 13, 13', 13", "Open door" opens a floor door 1, 1', 1' and/or car door 13, 13', 13", "Keep door open" keeps a floor door 1, 1', 1' and/or car door 13, 13', 13" open for a predefined and/or settable period of time, "Close door" closes a floor door 1, 1', 1' and/or car door 13, 13', 13", "Keep door closed" keeps a floor door 1, 1', 1' and/or car door 13, 13', 13" closed for a predefined and/or settable period of time, "Load state" indicates the current load of the elevator car 11, 11', 11" in percentages such as 0%, 10%, 20%, etc., "End" ends a communication.

Figure 6:
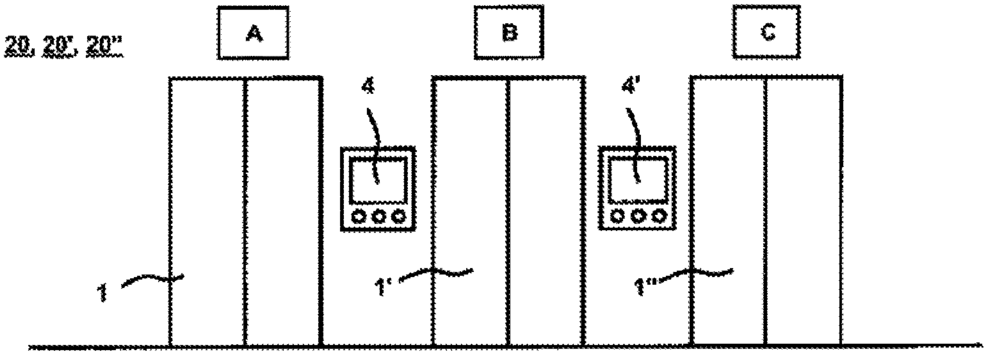
FIG. 6 shows a view of a part of a floor of the exemplifying embodiments of he modernized elevator installation according to FIGS. 3 and 4.
Figure 7:
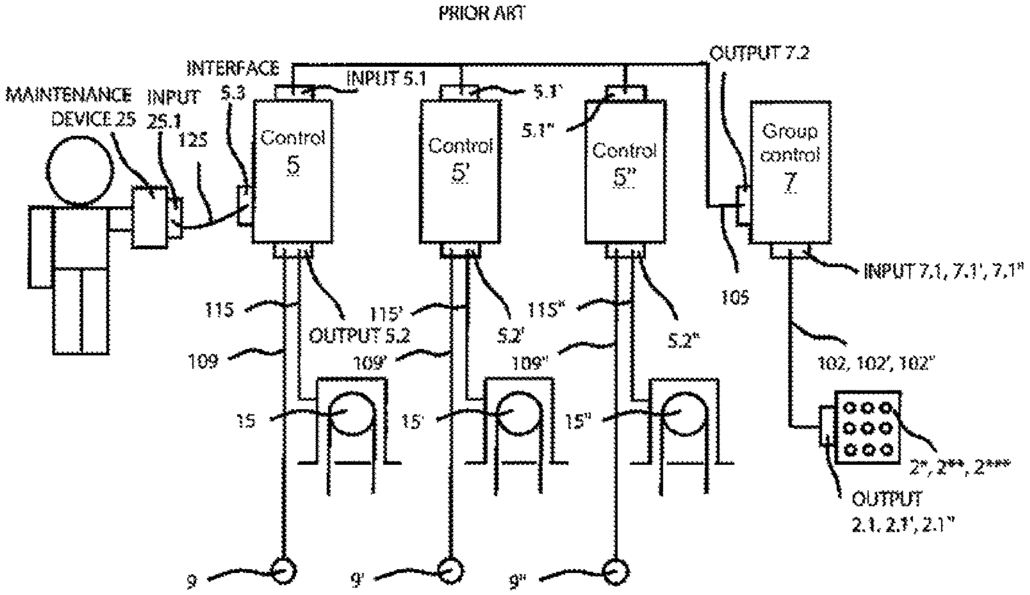
FIG. 7 shows a schematic circuit diagram of the first exemplifying embodiment of a conventional elevator installation with group control and signal bus, which is to be modernized, according to FIG. 1.
Figure 8:
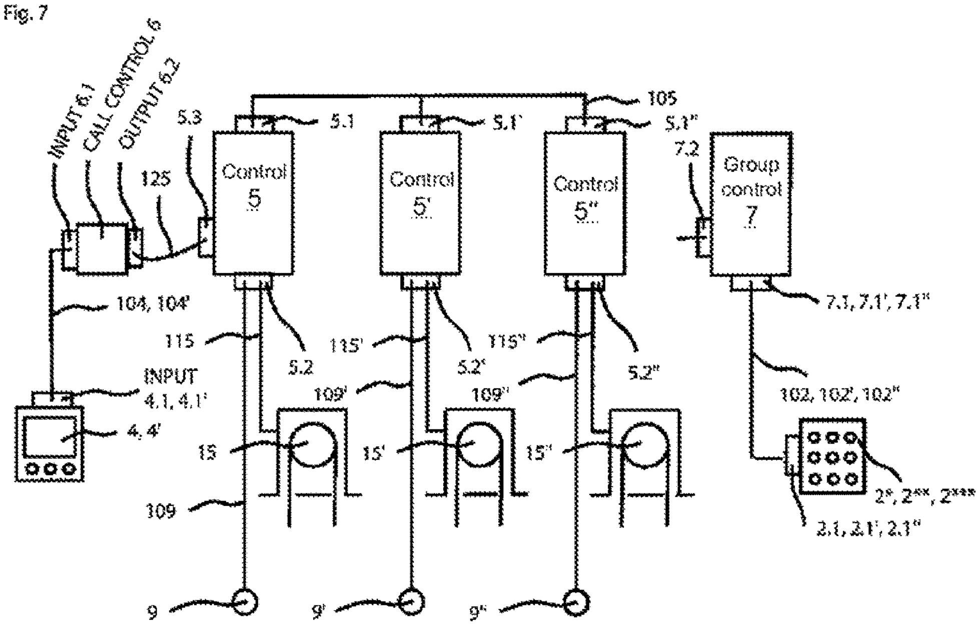
FIG. 8 shows a schematic circuit diagram of the first exemplifying embodiment the modernized elevator installation with group control and signal bus according to FIGS. 1, 3 and 7.
Figure 9:
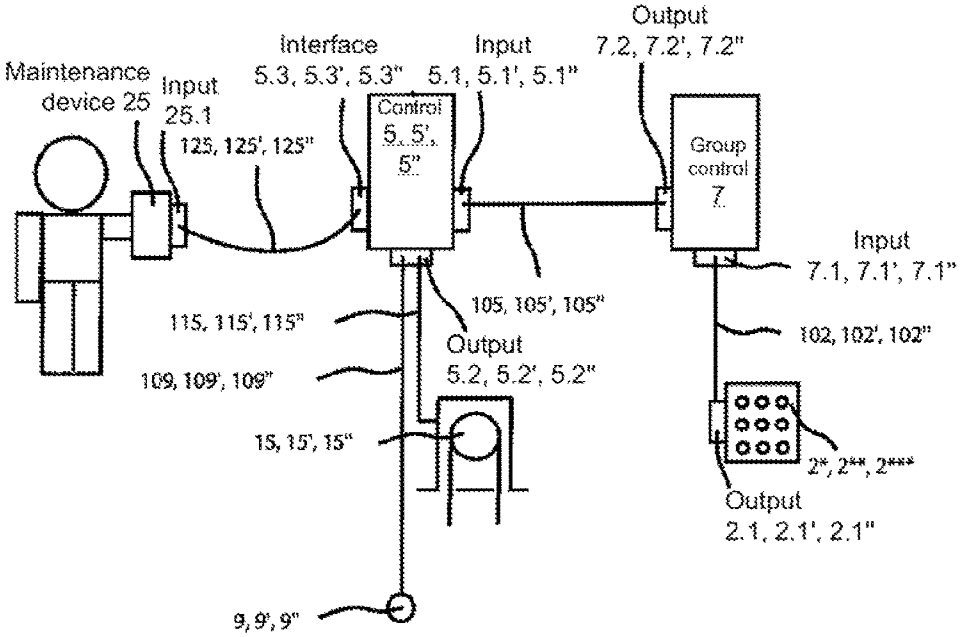
FIG. 9 shows a schematic circuit diagram of the first exemplifying embodiment of a conventional elevator installation with group control and without signal bus, which is to be modernized, according to FIG. 1.

For modernization of the existing elevator installation at least one destination call terminal 4, 4' is installed on a floor 20, 20', 20". For example, at least one destination call terminal 4, 4', is installed on each floor 20, 20, 20". According to FIG. 6 two destination floor terminals 4, 4' are installed on each floor 20, 20', 20" at building walls between the floor doors 1, 1', 1" of the elevators A, B, C. In principle, it is also possible to install the destination call terminal 4, 4' in isolation in a region spaced in front of the floor doors 1, 1', 1" of the elevators A, B, C. At least one output 4.1, 4.1' for at least one destination call terminal communications line 104, 104', at least one input/output device and at least one electrical power supply may be arranged in the housing of the destination call terminal 4, 4'. The input/output device is, for example, a keyboard, for example a numeric keypad, and/or a display screen and/or a touch screen and/or a card reader. The destination call terminal 4, 4' includes at least one processor and at least one computer readable data memory. A computer program from the computer readable data memory may be executed by the processor. The computer program controls the output 4.1, 4.1' and/or the input/output device. The input of a destination call on the destination call terminal 4, 4' can be carried out by the user through input of at least one number sequence "33", "12", etc., on the keyboard in order to specify a destination floor. The input of a destination call on the destination call terminal 4, 4' can alternatively be carried out by the user by touching at least one functional designator such as "Lobby", "Library", etc., on a touch screen. The input of a destination call by way of the destination call terminal 4, 4' can alternatively be carried out by input of an identification code by the user using a card reader, wherein at least one card with the stored identification code is held by the user at the card reader, the card transmits the identification code to the card reader and the card reader (either alone or in conjunction with other system components) recognizes the identification code. The card is, for example, a Radio Frequency Identification (MID) card. At least one destination floor can be associated with a recognized identification code by the destination call terminal 4, 4' and/or by at least one elevator call control 6.

At least one destination all control 6 is installed for modernization of the existing elevator installation. According to FIGS. 13 and 14, the destination call control 6 includes at least one programmed processor 60, at least one computer readable data memory 61, 61', at least one input 6.1 for at least one destination call terminal communications line 104, 104', at least one output 6.2 for at least one signal line 125 to the interlace 5.3, 5.3', 5.3" and input 604 for power, e.g., from the electrical power supply. A computer program from the computer readable data memory 61, 61' may be executed by the programmed processor 60. According to the embodiment of FIGS. 3 and 4 the destination call control 6 is an independent electronic unit having its own housing, which, for example, is placed in the engine room 3. The destination call control 6 can also be an electronic insert in the form of, for example, a circuitboard, which circuitboard is arranged in the housing of an existing or new destination call terminal 2*, 2, 2***, 4, 4' and/or in a housing of an existing or new elevator control and/or in a housing of an existing or new group control. In the exemplifying embodiments according to FIGS. 8, 10 and 12 the destination call terminal communications line 104, 104' is at least one signal bus, in which the members of the bus may be separately identified and communicated with, e.g., each communications participant may be uniquely identifiable by way of a signal bus address. The communication in the signal bus is bidirectional and is realized by, for example, a bus system such as a Local Operating Network (LON), Ethernet, etc. The computer program controls the communication by way of the input 6.1 with the destination call terminal 4, 4' and by way of the output 6.2 with the interface 5.3, 5.3', 5.3" of the elevator control 5, 5', 5"**.

Figure 10:
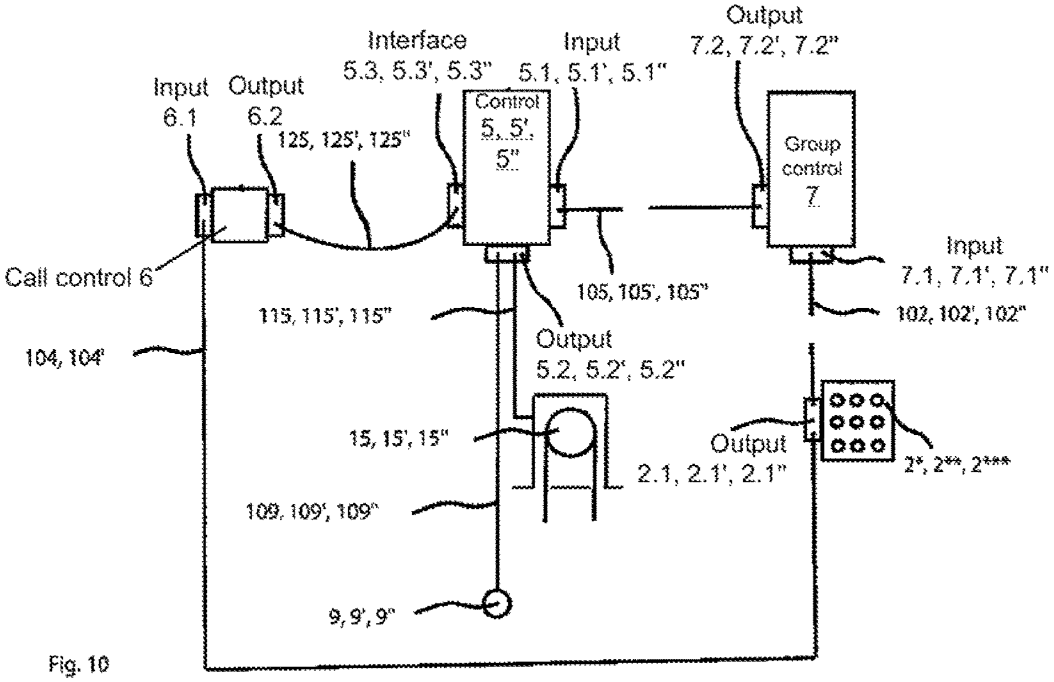
FIG. 10 shows a schematic circuit diagram of the first exemplifying embodiment of a modernized elevator installation with group control and without signal bus according to FIGS. 1 and 9.
Figure 11:
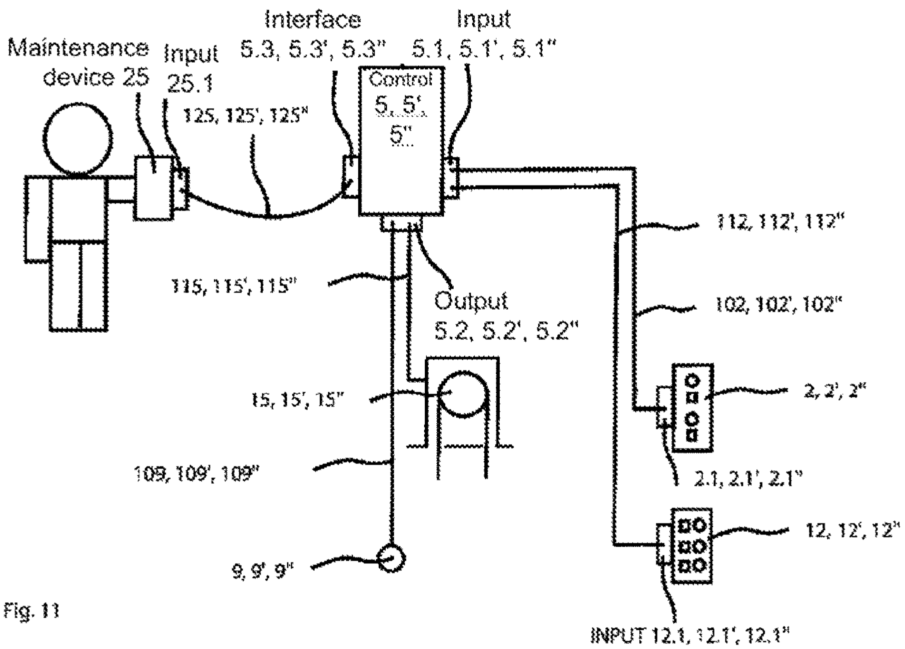
FIG. 11 shows a schematic circuit diagram of the second exemplifying embodiment of a conventional elevator installation without group control and without signal bus, which is to be modernized, according to FIGS. 2 and 5.
Figure 12:
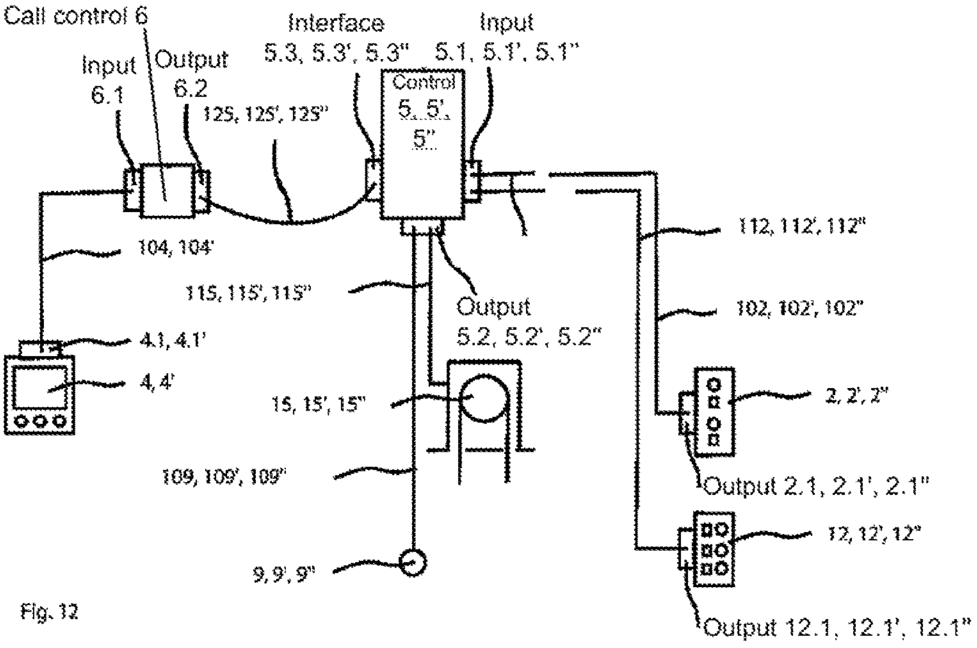
FIG. 12 shows a schematic circuit diagram of the second exemplifying embodiment of a modernized installation without group control and without signal bus according to FIGS. 2, 4, 5, 6 and 11.

The destination call terminal 4, 4' communicates to the destination call control 6, by way of the destination call terminal communications line 104, 104', an input destination call and/or a recognized identification code of a user as at least one destination call signal. Instead of installing destination call terminals 4, 4', it is also possible as shown in FIG. 10 to reuse existing destination call terminals 2*, 2, 2*** for connecting them directly with the destination call control 6 by means of at least one destination call terminal communications line 104, 104', 104". The destination call control 6 associates at least one destination call with an input identification code. For example, at least one destination call is stored in at least one computer readable data memory of the destination call control 6, which stored destination call can be associated with a particular identification code. In the case of a destination call, a designation of a desired destination floor takes place, already at the time of call input, so that a car call is no longer necessary. Thus, the destination call control 6 already knows the destination floor at the time of the call input and can therefore optimize not only the movement of an elevator car to the call input floor, but also the movement of the elevator car to the destination floor. The computer program of the destination call control 6 determines, for a destination call signal, at least one most favorable car and/or call allocation. The most favorable call allocation denotes a journey by at least one most favorable elevator car 11, 11', 11" from the input floor to the destination floor which may have the shortest possible waiting time and/or the shortest possible destination time. The current availability of the elevator A, B, C and/or the current loading of the elevator A, B, C and/or the current position of the elevator car 11, 11', 11" in the elevator shaft 10 may be used in the determination of the most favorable call allocation. The computer program of the destination call control 6 communicates with the elevator control 5, 5', 5" by way of the signal line 125 and the interface 5.3, 5.3', 5.3" and knows the information regarding elevator status, i.e., the current availability of an elevator A, B, C, and/or the load state, i.e., the current loading of an elevator A, B, C, and/or the car position, i.e., the current position of the elevator car 11, 11', 11" in the elevator shaft 10. If this information is not present it may be requested by the destination call control 6 by a corresponding command via the signal line 125 to the interface 5.3, 5.3', 5.3" at the elevator installation 5, 5', 5"**.

At least one start floor signal and at least one destination floor signal are generated for allocation of the most favorable call allocation. In accordance with the protocol of the interface 5.3, 5.3', 5.3" information regarding the most favorable elevator car 11, 11', 11" is communicated as commands via the signal line 125 to the interface 5.3, 5.3', 5.3" of the elevator control 5, 5', 5". The computer program of the destination call control 6 communicates, by a first command, a start signal floor to the elevator control 5, 5', 5" of the most favorable elevator car 11, 11', 11" and, by a second command, a destination floor signal to the elevator control 5, 5', 5" of the most favorable elevator car 11, 11', 11". According to the particular protocol, the start floor signal corresponds to a "floor call", i.e., a floor call to the input floor, and/or a "floor call upwards", i.e., a floor call to the input floor with travel destination in an upward direction, and/or a "floor call downwards", i.e., a floor call to the input floor with travel destination in a downward direction, and/or a "car call", i.e. a car call to the input floor, According to the particular protocol, the destination floor signal corresponds to a "floor call", i.e., a floor call to the destination floor, and/or a "floor call upwards", i.e., a floor call to the destination floor with travel destination in an upward direction, and/or a "floor call downwards", i.e., a floor call to the destination floor with travel destination in a downward direction, and/or a "car call", i.e., a car call to the destination floor.

The computer program of the destination call control 6 confirms a most favorable call allocation by at least one destination call acknowledgement signal. The destination call acknowledgement signal is transmitted from the input 6.1 of the destination control 6 via the destination call terminal communications line 104, 104' to the output 4.1, 4.1' of the destination call terminal 4, 4' and is optically and/or acoustically output on the input/output device of the destination call terminal 4, 4'. For example, at least one most favorable elevator car 11, 11', 11" and/or at least one determined arrival time at the start floor and/or the at least one determined arrival time at the destination floor is issued to the user as a destination call acknowledgement signal.

As soon as the destination call terminal 4, 4' and the elevator call control 6 are installed, the existing floor terminal 2, 2', 2" and/or the existing car call terminal 12, 12', 12" and/or the existing destination call terminal 2*, 2, 2*** of the elevator installation are made inaccessible to users. For example, at least one or all existing floor terminals 2, 2', 2" and/or the existing car call terminal 12, 12', 12" of the elevator installation are made inaccessible to users. This takes place, for example, by removing the existing floor terminal 2, 2' 2" and/or the existing car call terminal 12, 12', 12" or this takes place by installation of a covering in front of the existing floor terminal 2, 2', 2" and/or the existing car call terminal 12, 12', 12" in such a manner that the existing floor terminal 2, 2', 2" and/or the existing car call terminal 12, 12', 12" is no longer visible to or contactable by users. In addition, according to FIGS. 8 and 10, an existing group control 7 of the elevator installation is functionally separated from the elevator control 5, 5', 5" in that the elevator control communications line 105, 105', 105" between the group control 7 and the elevator control 5, 5', 5" is functionally and/or electrically and/or mechanically separated or otherwise does not allow the group control 7 to operate based on elevator control signals. If, according to FIG. 8, the existing destination call terminals 2*, 2**, 2*** communicate directly with the group control 7 the floor terminal communications line 102, 102', 102" to the group control 7 may be functionally and/or electrically and/or mechanically separated or otherwise controlled so as to not allow the group control 7 to operate based on destination call signals from existing destination call terminals 2*, 2**, 2***. If the elevator installation does not have a group control 7, according to FIG. 12 the floor terminal communications line 102, 102', 102" and/or the car call terminal communications line 112, 112', 112" can be separated from the elevator control 5, 5', 5". If the elevator installation is operated with at east one group control 7, at least one logging-off signal may be communicated as a command by the destination call control 6 in accordance with the protocol of the interface 5.3, 5.3', 5.3" via the signal line 125 to the elevator control 5, 5', 5", which logging-off signal results in the elevator control 5, 5', 5" being logged off at the group control 7**.

Figure 3:
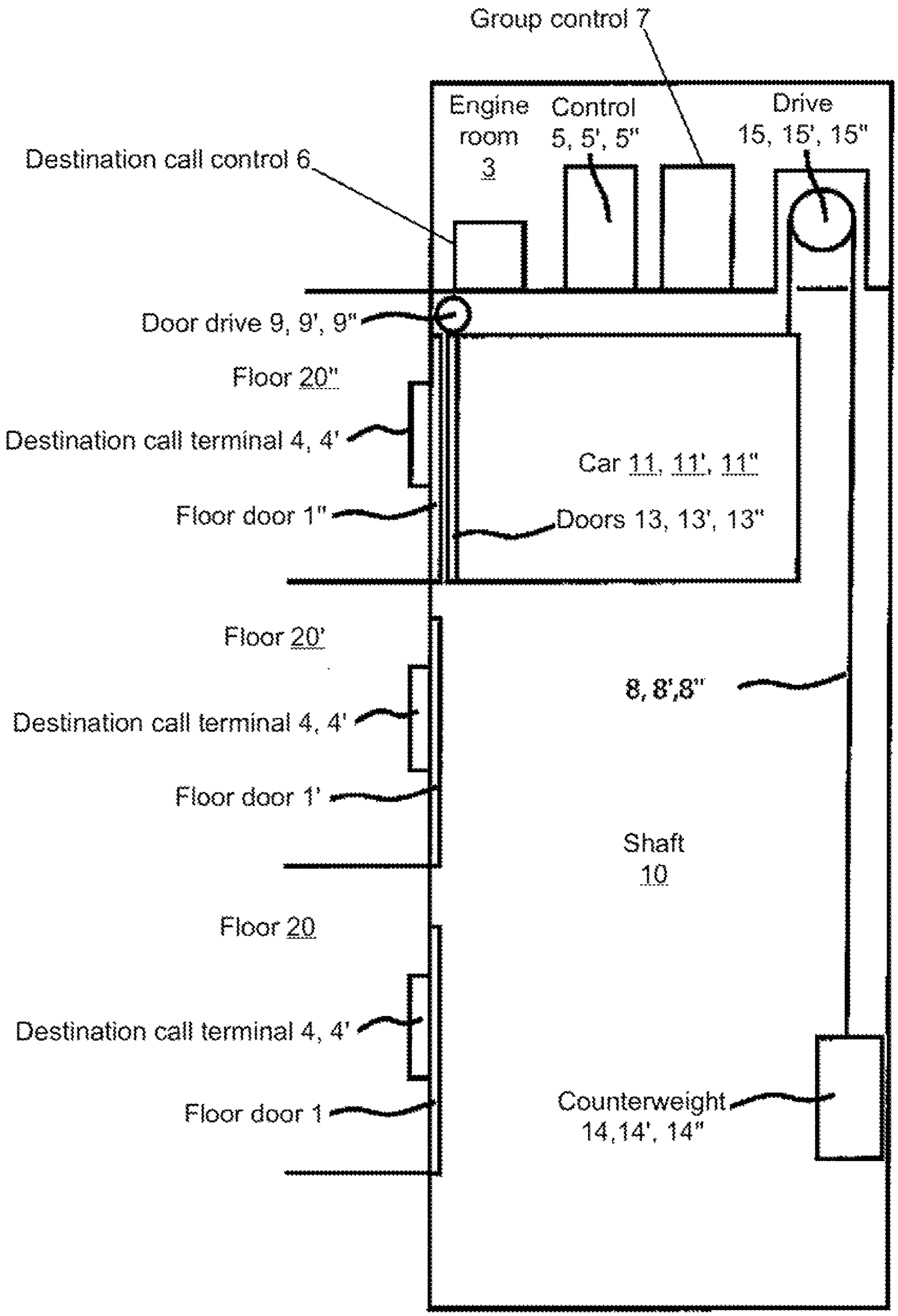
FIG. 3 shows a schematic view of a part of the first exemplifying embodiment of the modernized elevator installation with group control according to FIG. 1.
Figure 4:
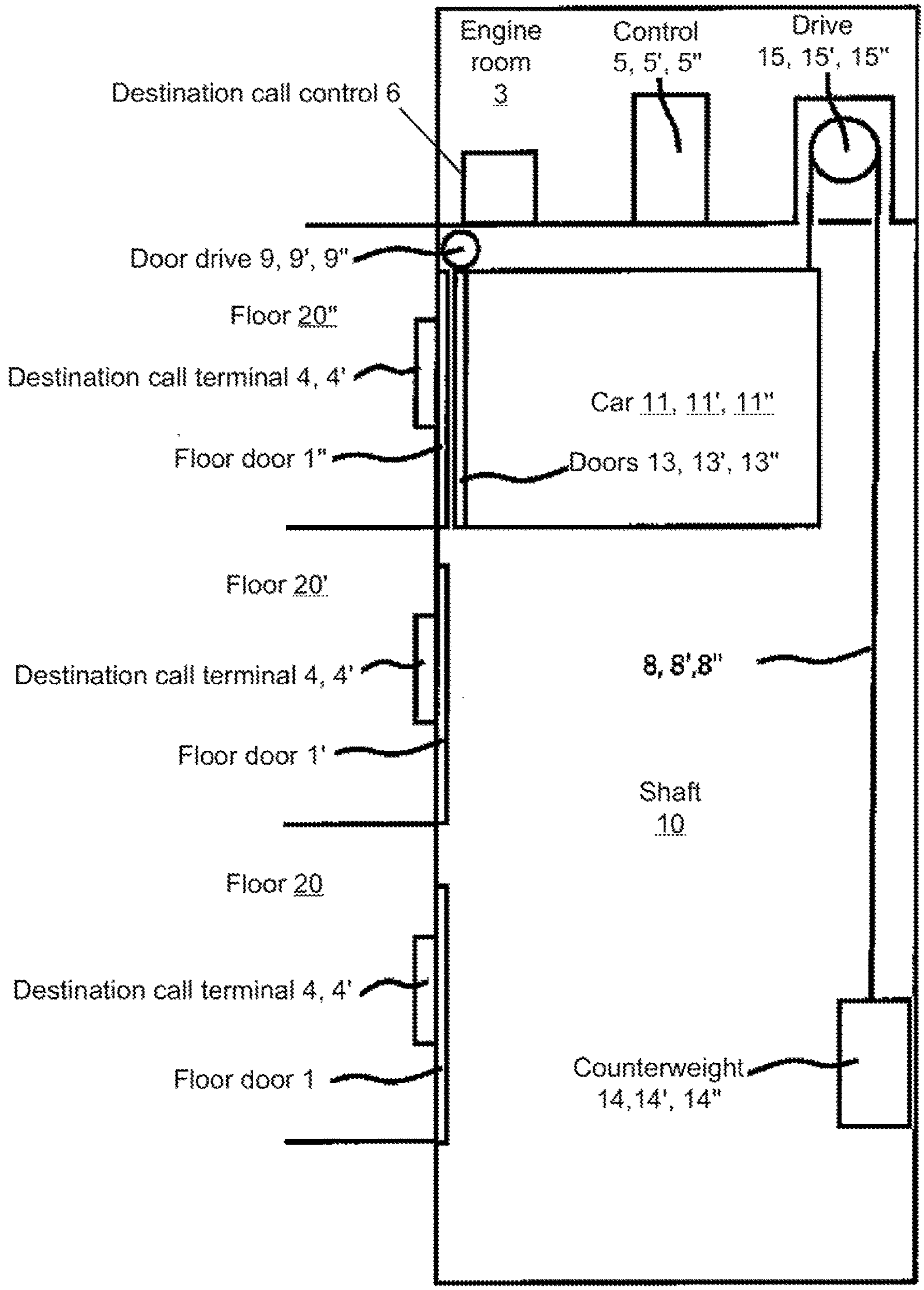
FIG. 4 shows a schematic view of a part of the second exemplifying embodiment of the modernized elevator installation without group control according to FIG. 2.
Figure 13:
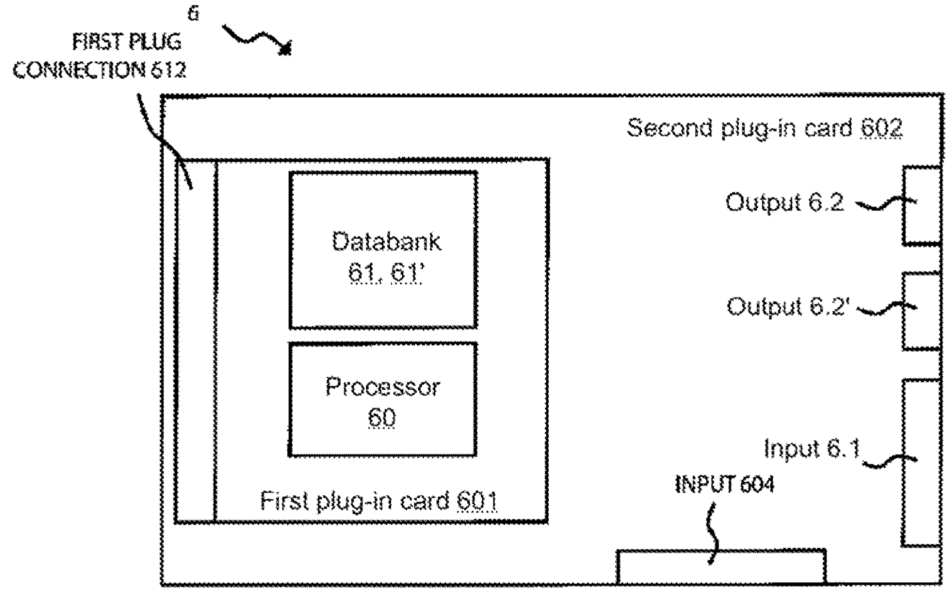
FIG. 13 shows a view of a part of a first exemplifying embodiment of a destination call control according to at least one of FIG. 3, 4, 8, 10 or 12.
Figure 14:
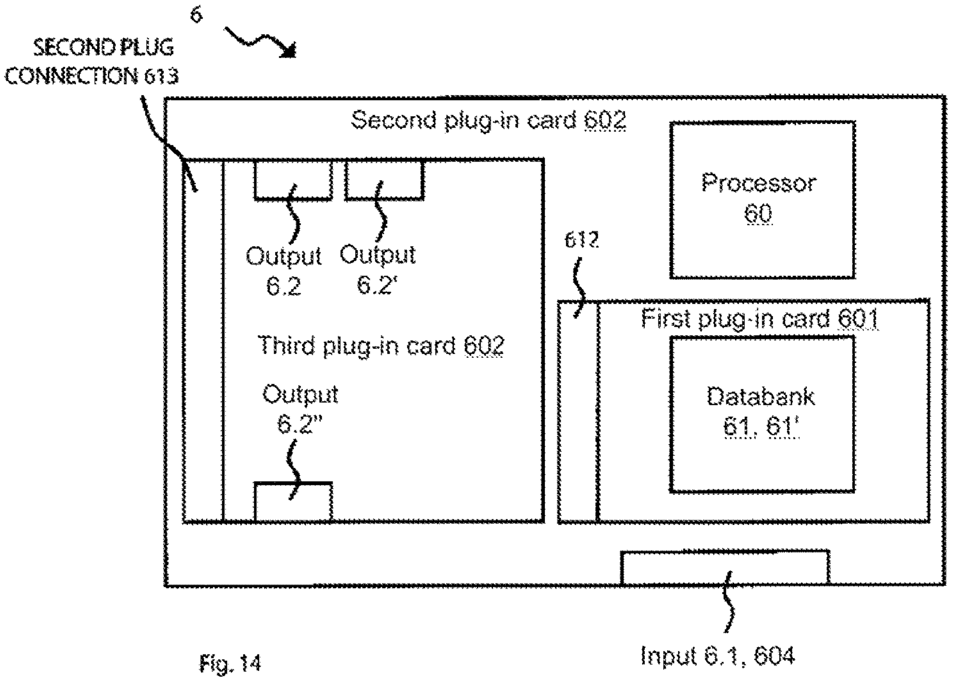
FIG. 14 shows a view of a part of a second exemplifying embodiment of a destination call control according to at least one of FIG. 3, 4, 8, 10 or 12.

FIGS. 13 and 14 show two exemplifying embodiments of a destination call control 6. In the form of embodiment according to FIG. 13, two plug-in cards 601, 602 are directly connected together to form a circuitboard and in the form of embodiment according to FIG. 14 three plug-in cards 601, 602, 603 are directly connected together to form a circuitboard. At least one programmed processor 60 and/or at least one computer readable data memory 61, 61' is/are arranged on a plug-in card 601, 602. At least one input 6.1 for at least one destination call terminal communication line 104, 104' and at least one output 6.2, 6.2', 6.2" for at least one signal line 125 to the interface 5.3, 5.3', 5.3" is/are arranged on a plug-In card 602, 603. With knowledge of the present invention obviously more than one input 6.1 or more than two or three outputs 6.2, 6.2', 6.2" can be mounted on a plug-in card 602, 603. The circuitboard can be mounted in its own housing as shown in FIGS. 3 and 4 and/or the circuitboard can be mounted as a push-in module in a housing of an existing or new destination call terminal 2*, 2, 2***, 4, 4'** and/or in a housing of an existing or new elevator control and/or in a housing of an existing or new group control.

A first plug-in card 601 is connected with a second plug-in card 602 by way of a first plug connection 612. According to FIG. 13 the first plug-in card 601 has a programmed processor 60 as well as either a databank 61 or a safety databank 61'. According to FIG. 14 the first plug-in card 601 has either a databank 61 or a safety databank 61' and the second plug-in card 602 has a programmed processor 60. This allows an easy and fast assembly of different kinds of a databank 61 and/or of a safety databank 61' with a programmed processor 60, According to FIG. 13 the second plug-in card 602 carries the first plug-in card 601, the input 6.1, two output 6.2, 6.2' as well as at least one input 604 for power and the wiring of these components.

The input 6.1 and/or the outputs 6.2, 6.2', 6.2" of the circuitboard can be of different standard. According to FIG. 14 three outputs 6.2, 6.2', 6.2" are directly mounted on the second plug-in card 602; while an input 6.1 and an input 604 for power and at least part of the electrical wiring are mounted on the third plug-in card 603; the third plug-in card 603 is connected with the second plug-in card 602 by way of a second plug connection 613. This allows an easy and fast assembly of different kinds of outputs 6.2, 6.2', 6.2" for at least one signal line 125 to the interface 5.3, 5.3', 5.3" with different kinds of an input 6.1 for at least one destination call terminal communication line 104, 104'. The input 6.1 may be a WAGO 734 plug tor a LON bus or a RJ45 adapter for an Ethernet network. The output may be a plug for RS232, RS422, USB, etc. The first plug-in card 601 and the second plug-in card 602 can be arranged on the same side or different sides of the second plug-in card 602. The plug connections 612, 613 are standard, reversible multi-plug connections.

The input 604 for power is also a standard, reversible multi-plug connection such as a WAGO 734 and supplies a 24 V electrical direct voltage at a maximum of 6 A electrical current for the circuitboard. According to FIG. 14, the input 604 for power is supplied by way of the input 6.1 for at least one destination call terminal communication line 104, 104' and be integrated in such an input 6.1. In the form of embodiment of an RJ45 plug the input for power 604 supplies an electrical direct voltage of 48 V and an electrical current of at most 350 mA for the circuitboard. The input 604 for power can, of course, also be is supplied by way of the output 6.2 for at least one signal line 125 to the interface 5.3, 5.3', 5.3" and be integrated in such an output 6.2. In the form of embodiment of an USB plug the input 604 for power supplies an electrical direct voltage of 5 V and an electrical current of at most 100 mA for the circuitboard.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. I therefore claim as my invention all that comes within the scope and spirit of these claims.

What is claimed is:

1. An elevator installation modernization method comprising:

placing a destination call control at an elevator installation, the destination call control being configured to generate start floor signals and destination floor signals based at least in part on at least one of a destination call signal or an identification code; and connecting the destination call control with an existing elevator control using an existing serial maintenance interface of the existing elevator control, such that the destination call control is configured to provide the start floor signals and the destination floor signals to the existing elevator control through the existing serial maintenance interface by implementing a communications protocol compatible with the existing serial maintenance interface to provide the start floor signals and the destination floor signals to the existing elevator control.

2. The elevator installation modernization method of claim 1, further comprising installing a destination call terminal at the elevator installation.

3. The elevator installation modernization method of claim 2, further comprising:

coupling the destination call terminal to the destination call control using a destination terminal communications line; and communicating the destination call signal e identification code from the destination call terminal to the destination call control.

4. The elevator installation modernization method of claim 1, wherein at least one existing destination call terminal on at least one input floor is used for input of at least one destination call or for input of at least one identification code, the existing destination call terminal generating at least one destination call signal or at least one identification code signal.

5. The elevator installation modernization method of claim 1, further comprising providing a communication link for communicating with the existing serial maintenance interface of the existing elevator control, wherein a communication can be established between the destination call control and the existing serial maintenance interface of the existing elevator control or between at least one maintenance device and the existing serial maintenance interface of the existing elevator control.

6. The elevator installation modernization method of claim 1, further comprising preventing access to an existing floor terminal at the elevator installation and preventing access to an existing car call terminal at the elevator installation.

7. The elevator installation modernization method of claim 1, further comprising preventing access to an existing destination call terminal of the elevator installation.

8. The elevator installation modernization method of claim 1, further comprising:

functionally separating a group control from the elevator control; and logging of the elevator control from the group control by transmitting at least one logging-off signal from the destination call control to the existing elevator control using a communication link.

9. The elevator installation modernization method of claim 1, wherein the communications protocol of the existing serial maintenance interface used by the destination call control or by a maintenance device describes a plurality of modules, each module having a set of commands, and wherein the existing elevator control is controllable by a sequential series of commands.

10. The elevator installation modernization method of claim 9, wherein the existing elevator control communicates one or more items of information continuously, at regular intervals, or at irregular intervals.

11. The elevator installation modernization method of claim 1, further comprising communicating an elevator availability from the existing elevator control to the destination call control through the existing serial maintenance interface.

12. The elevator installation modernization method of claim 1, further comprising communicating elevator loading information from the existing elevator control to the destination call control through the existing serial maintenance interface.

13. The elevator installation modernization method of claim 1, further comprising communicating elevator car position information from the existing elevator control to the destination call control through the existing serial maintenance interface.

14. An elevator modernization device, comprising:

a processor; a serial interface configured to connect the elevator modernization device with an existing maintenance interface of at least one existing elevator control of an elevator installation; and a memory storing instructions which, when executed by the processor, cause the processor to generate start floor signals and destination floor signals based at least in part on a destination call signal or an identification code, and which further cause the processor to communicate the start floor signals and the destination floor signals to the at least one existing elevator control through the existing serial maintenance interface, wherein the elevator modernization device is configured to use a communications protocol that is compatible with the existing serial maintenance interface to provide the start floor signals and the destination floor signals to the at least one existing elevator control.

15. The elevator modernization device of claim 14, wherein the elevator modernization device is configured to be coupled to at least one destination call terminal, the destination call terminal being configured to provide the destination call signal or the identification code to the elevator modernization device.

16. The elevator modernization device of claim 14, wherein the communications protocol used by the elevator modernization device describes a plurality of modules, each module having a set of commands, wherein the existing elevator control is controllable by a sequential series of commands.

17. An elevator installation comprising:

a destination call terminal;

a destination call control coupled to the destination call terminal and implementing a communications protocol compatible with a serial maintenance interface and receiving start floor signals and destination floor signals from the destination call terminal;

an elevator control comprising the serial maintenance interface and coupled to the destination call control through the serial maintenance interface, and receiving the start floor signals and the destination floor signals from the destination call control implementing the communications protocol via the serial maintenance interface.

18. An elevator installation modernization method comprising:

generating, by a destination call control, start floor signals and destination floor signals based at least in part on at least one of a destination call signal or an identification code;

connecting, using an existing serial maintenance interface of the existing elevator control, the destination call control with an existing elevator control;

implementing, by the destination call control, a communications protocol compatible with the existing serial maintenance interface to provide the start floor signals and the destination floor signals to the existing elevator control; and transmitting, by the destination call control, the start floor signals and the destination floor signals to the existing elevator control using the communications protocol and the existing serial maintenance interface.

* * * * *